United States Patent [19]
Dobler et al.

[11] Patent Number: 5,863,107
[45] Date of Patent: Jan. 26, 1999

[54] HEADLIGHT FOR VEHICLE

[75] Inventors: Karl-Otto Dobler, Reutlingen; Jan Fischer, Tübingen, both of Germany

[73] Assignee: Robert Bosch GmbH, Stuttgart, Germany

[21] Appl. No.: 654,274

[22] Filed: May 28, 1996

[30] Foreign Application Priority Data

May 30, 1995 [DE] Germany .................. 195 19 651.1

[51] Int. Cl.[6] .................................................. B60Q 1/04
[52] U.S. Cl. .................. 362/80; 362/61; 362/289; 362/419; 362/428
[58] Field of Search ................ 362/61, 80, 66, 362/289, 285, 287, 364, 365, 418, 419, 427, 428, 425

[56] References Cited

U.S. PATENT DOCUMENTS

| | | | |
|---|---|---|---|
| 4,188,655 | 2/1980 | Tallon | 362/80 |
| 4,475,148 | 10/1984 | Tomforde | 362/80 |
| 4,722,033 | 1/1988 | VanDuyn et al. | 362/80 |
| 4,843,531 | 6/1989 | Mochizuki et al. | 362/80 |

FOREIGN PATENT DOCUMENTS 19 30 736  12/1976  Germany .

*Primary Examiner*—Thomas M. Sember
*Attorney, Agent, or Firm*—Michael J. Striker

[57] ABSTRACT

A headlight for vehicles includes a headlight insert with a reflector and a light source inserted in the reflector, a holder mountable on a vehicle part and supporting the headlight insert so that the headlight insert is turnable about a horizontal axis relative to the holder for orientation of a light bundle emitted from the headlight insert, an adjusting screw cooperating with an adjusting element and actuatable to turn the headlight insert about the horizontal axis and a releasable mounting element for mounting the headlight insert at least directly on the holder. The adjusting screw being held on the holder rotatably and axially non-displaceably and the adjusting element being held on the holder axially displaceably and non-rotatably. The headlight insert being mounted on the adjusting element by the mounting element and the headlight unit being turnable back about the horizontal axis from the holder when the mounting element is released so that the light source is accessible from a front side of the holder.

5 Claims, 3 Drawing Sheets

HEADLIGHT FOR VEHICLE

BACKGROUND OF THE INVENTION

The present invention relates to a headlight for vehicles.

Headlights for vehicles are known in the art. One of such headlights is disclosed in the German patent document DE 19 30 76 B2. This headlight has a headlight insert with a reflector and a light source arranged in it. The headlight insert is supported on a holder which is mounted on a vehicle part. The headlight insert is turnable about the horizontal axis for orientation of the light bundle emitted from it. The headlight also has an adjusting device with an adjusting screw arranged on an upper edge region of the headlight insert and cooperating with an adjusting element which is screwed on it. The adjusting screw is held on the headlight insert rotatably and axially non-displaceably, and the adjusting element forms a part of the holder which is mounted on the vehicle part by a releasable mounting element. The mounting element is formed as a U-shaped leaf spring which is connected by its one leg to the adjusting element and by its another leg to the vehicle part. During mounting of the headlight on the vehicle part, it is inserted on its lower region which forms the horizontal turning axis into the holder, and inserted with its upper edge region to the mounting element on the vehicle part. Then the headlight insert is turned by an actuation of the adjusting screw from the rear side of the headlight about the horizontal axis in a turning region which is sufficient for the orientation of the light bundle and at the same time is limited. It is necessary to provide on the vehicle a sufficient mounting space at the rear side of the headlight for arranging the adjusting screw and for its actuation. The mounting element is arranged freely between the headlight insert and the vehicle and relatively easily deformable, so that the connection of the headlight insert with the vehicle part can be displaced under certain conditions in the event of the occurrence of forces acting on the headlight insert, by a deformation of the mounting element, so that the orientation of the light bundle emitted by the headlight is no longer correct. However, the space which is available for mounting of the headlight in the vehicles is limited. The headlight moreover must be accessible from its rear side for an exchange of the light source. This also requires a great space at the rear side of the headlight, since otherwise the headlight must be completely dismounted which is very expensive.

SUMMARY OF THE INVENTION

Accordingly, it is an object of the present invention to provide a headlight of the above-mentioned general type, which avoids the disadvantages of the prior art.

In keeping with these objects and with others which will become apparent hereinafter, one feature of the present invention resides, briefly stated, in a headlight for a vehicle, in which the adjusting screw is held on the holder rotatably and axially non-displaceably, the adjusting element is axially displaceable on the holder but is guided non-rotatably, the headlight insert is mountable on the adjusting element by a mounting element, and the headlight insert with a release mounting element is turnable about a horizontal axis of the holder so that the light source is accessible from the rear side of the holder.

When the headlight is designed in accordance with the present invention, it has the advantage that by turning back the headlight insert from the holder, an exchange of the light source is possible in a simple manner, so that at the rear side of the headlight only a small mounting space is needed on the vehicle. It suffices only to turn back the headlight, while the adjusting screw as well as the adjustment element remain on the holder, so that for turning back of the headlight also a small free space is needed.

In accordance with another embodiment of the present invention, the holder is formed as a holding frame which is connectable with the chassis of the vehicle. Therefore a rigid connection of the headlight insert with the adjusting element is provided, so that the headlight insert cannot be displaced in an undesirable manner under the action of forces.

In accordance with still another feature of the present invention, the adjusting screw is accessible from the front side of the holder for its actuation. In this construction no additional mounting space is needed for actuation of the adjusting screw at the rear side of the headlight.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
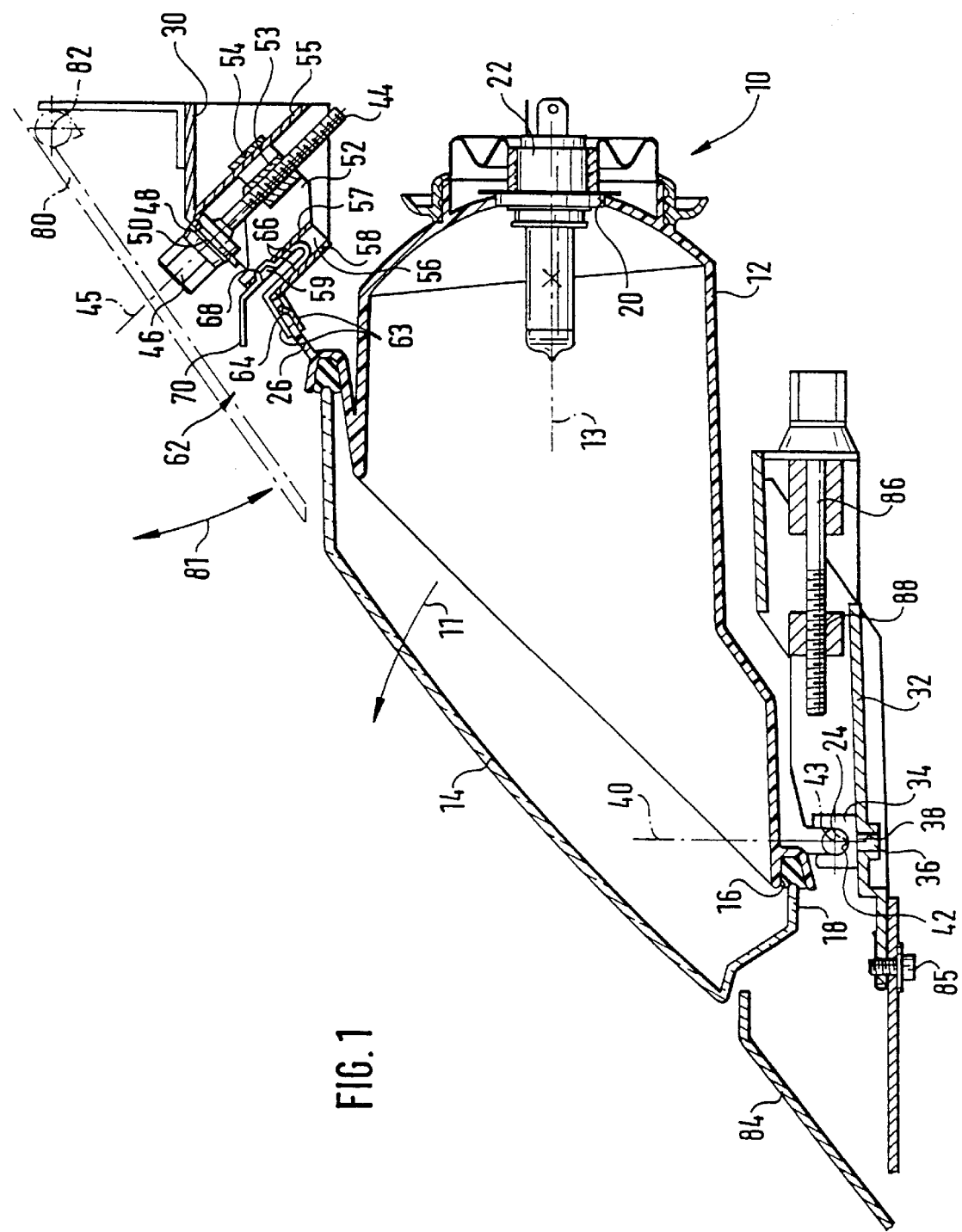
FIG. 1 is a view showing a vertical longitudinal section 1—1 of a headlight in accordance with the present invention.
Figure 2:
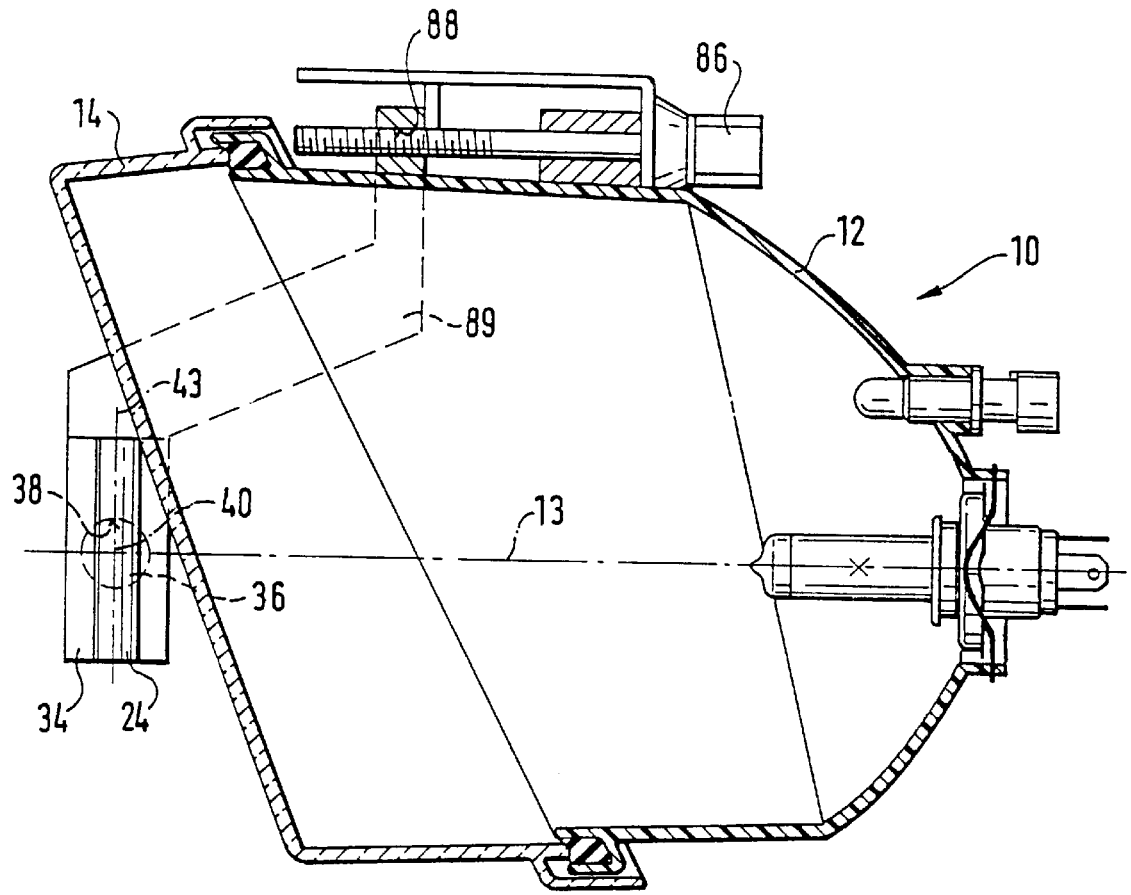
FIG. 2 is a view showing the inventive headlight in a horizontal longitudinal section 1—1.
Figure 3:
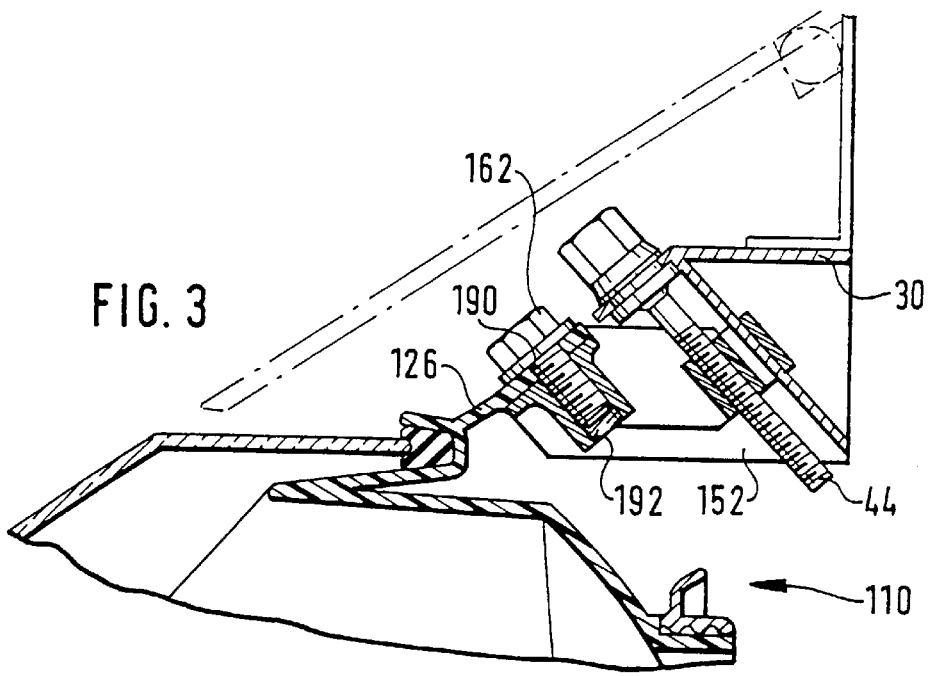
FIG. 3 is a view showing the section of the headlight with a modified mounting element.
Figure 4:
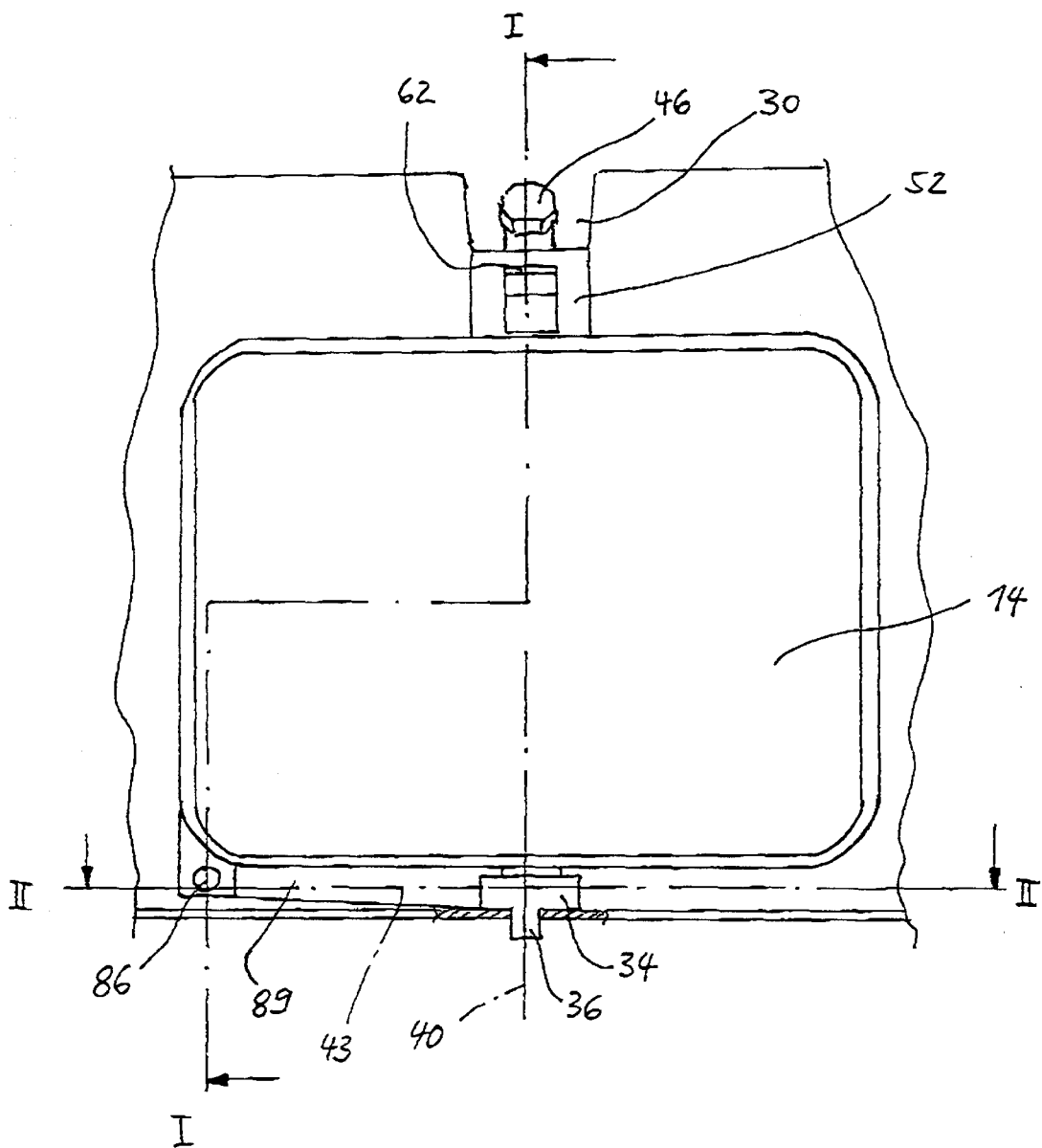
FIG. 4 is a front view of the headlight in accordance with the present invention, with removed chassis parts.

A headlight for vehicles, in particular, motor vehicles, shown in FIGS. 1–3, has a headlight insert 10 with a reflector 12 and a cover member 14 mounted on its front edge. The reflector 12 is composed of a synthetic plastic material and has a groove 16 provided on its front edge. The cover member 14 has a circumferential edge 18 arranged in the groove 16. The reflector 12 can be composed of metal. The edge 18 of the cover member 14 can be glued in the groove 16 or held by a not-shown clamp. The reflector 12 together with the cover member 14 forms a rigid insert. A light source 22 is inserted in the reflector 12 from its rear side in an opening 20 to be located in an apex region. The light source can be formed as an incandescent lamp or a gas-discharge lamp and can be mounted on the reflector 12 in a not-shown manner.

A pin 24 is arranged on the lower edge of the reflector 12 near its front edge. It can be formed preferably of one piece with the reflector 12 and arranged substantially horizontally and perpendicularly to the optical axis 13 of the reflector 12. Also, two pins 24 can be provided on the reflector 12 and located near one another. An upwardly extending projection 26 is arranged on the upper edge of the reflector 12 near its front edge and can be formed preferably of one piece with the reflector 12.

The headlight insert 10 which is composed of the reflector 12, the cover member 14 and the light source 22, is supported on a holder 30 which is mountable on the vehicle part. The holder 30 can be a part of the chassis of the vehicle, or it can be formed as a holding frame mountable on the chassis of the vehicle in accordance with the shown embodiment. The holding frame 30 is composed preferably of synthetic plastic material. However, it can be composed of metal as well. It has a wall 32 which extends substantially horizontally and is arranged under the headlight insert 10. A bearing block 34 is arranged on the wall 32. It is inserted with a downwardly projecting pin 36 which is arranged on the bearing block, into an opening 38 and the wall 32 of the holding frame 30. The bearing block 34 is supported turnably about a vertical axis 40 via its pin 36 in the opening 38. The bearing block 34 also has one or two bearings 42 for the pin or the pins 24 of the reflector 12, in which they are received turnably about an horizontal axis 43.

An adjusting screw 44 is held on the region of the holding frame 30 arranged above the headlight insert 10, rotatably but non-displaceably in the direction of its longitudinal axis 45. The adjusting screw 44 has a head extending towards the front side of the headlight from the holding frame 30. The rotatable and axially non-displaceable holding of the adjusting screw 44 on the holding frame 30 can be performed for example in the manner that the adjusting screw 44 is provided with a ring groove 50 in the region in which it passes through an opening 48 in the holding frame 30, and a circumferential edge of the opening 48 of the holding frame 30 engages in the ring groove.

An adjusting element 52 composed of synthetic plastic material or metal is screwed on the threaded shaft of the adjusting screw 44. The adjusting element 52 has a nut part 53 with an inner thread, over which it is screwed on the threaded shaft of the adjusting screw 44. A U-shaped bracket 54 is formed of one piece with the nut part 53 and extends upwardly from the nut part. It merges into a rail 55 arranged on the holding frame 30. The adjusting element 52 is guided displaceably in the direction of the longitudinal axis 45 of the adjusting screw 44 and at the same time non-rotatably, via the bracket 54 and the rail 55. The adjusting element 52 also has a portion which is formed of one piece with the nut part 53 and extends downwardly toward the headlight insert 10. This portion is provide with a slot-shaped receptacle 56. The slot-shaped receptacle extends substantially parallel to the longitudinal axis 45 of the adjusting screw 44. It is limited by two substantially parallel walls 57 and 58 from above toward the nut part 53 and from below toward the headlight insert 10. The upper wall 57 has an opening 59. Alternatively, on its place, also a depression or a recess can be provided at the inner side of the wall 58.

A mounting element 63 is mounted on the upwardly extending projection 26 of the reflector 12. It can be formed as a leaf spring and composed of metal. The mounting element 62 is mounted as a clamp on the projection 26 and has several legs 63. At least one of the legs abuts against the front side of the projection 26, and at least another leg abuts against the rear side of the projection 26. During displacement on the projection 26, the legs 63 are spring-biased from one another so that the mounting element 62 is clamped on the projection 26. In addition a hook 64 can be formed from at least one leg 63 toward the projection 26. It can engage in the projection 26 or in a depression in the projection 26, so that the mounting element 62 is secured on the projection. The mounting element 62 can be provided with a U-shaped portion located on the legs 63 and extending upwardly. Its leg 66 extends substantially parallel to the wall 571 68 of the receptacle 56 of the adjusting element 52 and its free ends face the front side of the headlight insert 10. The upward leg 66 of the mounting element 62 has an upwardly extending raised portion 68 and a forwardly extending actuation arm 70.

The vehicle is provided with a cover cap 80 which can be a part of its chassis and covers the adjusting screw 44 as well as the mounting element 62. The cover cap 80 is removable to allow an actuation of the adjusting screw 44 and the mounting element 62 from the front side of the headlight. The cover cap 80 can be turnable for example on its upper edge region about a horizontal axis 82 between one position in which it covers the adjusting screw 44 and the mounting element 62, and a position in which it releases the adjusting screw 44 and the mounting element 62. The turning is performed in the direction of the double arrow 81. In the position in which it covers the adjusting screw 44 and the mounting element 62, the cover cap 80 is arrested in a not-shown manner. A further vehicle part, for example a chassis part 84, can be arranged under the headlight and can be also removable. It can be formed for example as a flap which is turnable.

For mounting the headlight, first the mounting element 62, as described above, is placed with its feet 63 on the projection 26 of the reflector 12. The pin 24 of the reflector 12 is inserted into the bearing 42 of the bearing block 34, and the pin 24 can be held arrestingly in the bearing 42, so that the bearing block 34 is connected with the reflector 12. The adjusting screw 44 and the adjusting element 52 are mounted on the holding frame 30. The bearing block 34 held on the headlight insert 10 is inserted with its pin 36 into the opening 38 in the wall 32. After this, the headlight insert 10 is turned with its upper edge region about the horizontal axis 43 relative to the holding arm 30, and the leg 66 of the mounting element 62 engages in the slot-like receptacle 56 of the adjusting element 52. The legs 66 are compressed in a springy manner, and the upper leg 66 engages with its raised portion 68 into the opening 59 of the upper wall 58 of the receptacle 56 in the end position of the headlight insert 10. The holding frame 30 together with the headlight insert 10 arranged on it form a premounted structural unit. For mounting of the headlight unit on the vehicle, the cover cap 80 and the chassis part 84 are removed and the structural unit is mounted on the provide vehicle part, for example by one of several screws 85.

The legs 66 of the mounting element 62 are located in the receptacle 56 approximately over their whole length on the walls 57, 58. Therefore, they are not deformed or can be deformed only a little under the action of forces acting on the headlight insert 10. The legs 66 are connected directly with the legs 63, so that also in the transition region of the mounting element 62 arranged outside the receptacle 56, they cannot be deformed or can be deformed only very little. Generally, a rigid connection of the headlight insert 10 with the holder 30 is provided.

For orientation of the light bundle emitted by the headlight insert 10 in a vertical direction, the adjusting screw 44 is turned. As a result, the headlight insert 10 is turned about the horizontal axis 43 and the inclination of the headlight insert 10 and thereby the light bundle emitted by it is increased or reduced. After mounting of the headlight unit and the orientation of the headlight insert 10, the cover cap 80 is brought to its position in which it covers the adjusting screw 40 and the mounting element 62, and the chassis part 84 is mounted again.

When it is necessary to exchange the light source 20, the cover cap 80 and the chassis part 84 are removed and the mounting element 62 can be released. The mounting element 62 is released by pressing its actuating arm 70 downwardly, so that the lifting portion 68 of the upper leg 66 is released from the opening 59. Thereafter, the headlight insert 10 is turned back about the axis 43 with its upper edge region in the direction of the arrow 11 from the holding arm 30. Its rear side becomes accessible from the front side of the holding frame 30 as considered in the traveling direction of the vehicle, for exchange of the light source 22. The turning movement of the headlight insert 10 can be limited for example by the abutment of the edge 18 of the cover member 14 against the wall 32 of the holding frame 30. The adjusting screw 44 and the adjusting element 52 remain on the holding frame 30 during turning back of the headlight insert. After the exchange of the light source 22, the headlight insert 10 is again turned toward the holding frame 30 until the mounting element 62 engages with the adjusting element 52. The orientation of the headlight insert 10 is again performed as before the turning back, without the need for a new adjustment. When an exchange of the headlight insert 10 is needed, it is turned as described above from the holding frame 30. The bearing block 34 can be lifted upwardly with its pin 36 from the opening 38 of the holding frame 30. Thereby the headlight insert 10 can be removed and a new headlight insert can be inserted in a reverse order.

The headlight insert 10 can be turned additionally about the vertical axis 40 for orientation of the light emitted by it in a horizontal direction. For this purpose a further adjusting screw 86 is held rotatably but not-displaceably in the direction of its longitudinal axis on the holding frame 30 in a lateral and a lower region. The adjusting screw 86 is screwed with its threaded portion into a threaded opening 88 of a support 89 connected with a bearing block 34. During rotation of the adjusting screw 86, the bearing block 34 turns the headlight insert 10 about the vertical axis 40 by turning the pin 36 of the bearing block 34 in the opening 38 of the holding frame 30. The vertical axis 40 extends so that it intersects the optical axis 13 of the reflector 12. The raised portion 68 of the mounting element 62 and the opening 59 in the wall 57 of the receptacle 56 are located preferably on the vertical rotary axis 40, so that the turning movement of the headlight insert 10 about the axis 40 is not prevented. When the raised portion 68 and the opening 59 are located not on the rotary axis 40, then the mounting element 62 and/or the displacement element 52 are substantially horizontally movable or elastically deformable perpendicular to the axis 40 for allowing the turning movement around the axis 40.

FIG. 3 shows the headlight insert 110 with a modified mounting element 162. The mounting element 162 is formed as a screw which extends through an opening 190 in the upwardly extending projection 126 of the reflector 110. The head of the screw 162 is arranged on the front side of the headlight insert 110. The screw 162 is screwable in a threaded opening 192 of the adjusting element 152, and therefore the headlight insert 110 can be coupled with the adjusting element 152. The adjusting element 152, as described above, is guided on the holding frame 30 non-rotatably and displaceably in the direction of the longitudinal axis of the adjusting screw 44. The remaining construction of the headlight and the process of orientation of the headlight insert 110 and exchange of the light source 22 are performed as described hereinabove.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for vehicles, comprising a headlight insert with a reflector and a light source inserted in said reflector; a holder mountable on a vehicle part and supporting said headlight insert so that said headlight insert is turnable about a horizontal axis relative to said holder for orientation of a light bundle emitted from said headlight insert; an adjusting screw cooperating with an adjusting element and actuatable to turn said headlight insert about said horizontal axis; a releasable mounting element for mounting said headlight insert at least directly on said holder, said adjusting screw being held on said holder rotatably and axially non-displaceably, said adjusting element being held on said holder axially displaceably and non-rotatably, said headlight insert being mounted on said adjusting element by said mounting element, said headlight insert being turnable back about said horizontal axis from said holder when only said mounting element is released, so that said light source is accessible from a front side of said holder.

2. A headlight as defined in claim 1, wherein said holder is formed as a holding frame connectable with a chassis of a vehicle.

3. A headlight as defined in claim 1, wherein said adjusting screw is accessible from the front side of the holder for actuation of said adjusting screw.

4. A headlight for vehicles, comprising a headlight insert with a reflector and a light source inserted in said reflector; a holder mountable on a vehicle part and supporting said headlight insert so that said headlight insert is turnable about a horizontal axis relative to said holder for orientation of a light bundle emitted from said headlight insert; an adjusting screw cooperating with an adjusting element and actuable to turn said headlight insert about said horizontal axis; a releasable mounting element for mounting said headlight insert at least directly on said holder, said adjusting screw being held on said holder rotatably and axially non-displaceably, said adjusting element being held on said holder axially displaceably and nonrotatably, said headlight insert being mounted on said adjusting element by said mounting element, said headlight insert being turnable back about said horizontal axis from said holder when only said mounting element is released, so that said light source is accessible from a front side of said holder, and a removable cover element which covers said adjusting screw and said mounting element.

5. A headlight as defined in claim 4, wherein said cover element is formed as a part of the chassis of a vehicle.

* * * * *